(12) United States Patent
Yeon

(10) Patent No.: US 12,005,978 B2
(45) Date of Patent: Jun. 11, 2024

(54) STEERING CONTROL DEVICE, STEERING CONTROL METHOD, AND STEERING SUPPORT SYSTEM INCLUDING SAME

(71) Applicant: HL MANDO CORPORATION, Pyeongtaek (KR)

(72) Inventor: Je Hyeon Yeon, Wonju (KR)

(73) Assignee: HL MANDO CORPORATION, Pyeongtaek (KR)

( * ) Notice: Subject to any disclaimer, the term of this patent is extended or adjusted under 35 U.S.C. 154(b) by 182 days.

(21) Appl. No.: 17/637,112

(22) PCT Filed: Aug. 26, 2020

(86) PCT No.: PCT/KR2020/011382
§ 371 (c)(1),
(2) Date: Feb. 22, 2022

(87) PCT Pub. No.: WO2021/040399
PCT Pub. Date: Mar. 4, 2021

(65) Prior Publication Data
US 2022/0340199 A1 Oct. 27, 2022

(30) Foreign Application Priority Data
Aug. 30, 2019 (KR) ......................... 10-2019-0107020

(51) Int. Cl.
*B62D 6/00* (2006.01)
(52) U.S. Cl.
CPC ................................... *B62D 6/008* (2013.01)
(58) Field of Classification Search
CPC .................................................... B62D 6/008
See application file for complete search history.

(56) References Cited

U.S. PATENT DOCUMENTS

2004/0003954 A1* 1/2004 Sugitani .................. B62D 1/12
180/402
2004/0031641 A1* 2/2004 McLaughlin ........ B62D 5/0463
180/446
(Continued)

FOREIGN PATENT DOCUMENTS

CN 1675099 A 9/2005
CN 105691445 A 6/2016
(Continued)

OTHER PUBLICATIONS

Office Action issued in Chinese Patent Application No. 202080061255.2 dated Dec. 4, 2023.
(Continued)

*Primary Examiner* — Khoi H Tran
*Assistant Examiner* — Tristan J Greiner
(74) *Attorney, Agent, or Firm* — Harvest IP Law, LLP

(57) ABSTRACT

Disclosed are a steering control device, a steering control method, and a steering support system including same. Particularly, the steering control device according to the present disclosure comprises: a noise frequency calculation unit for calculating the noise frequency of noise transmitted to a wheel; a noise frequency filtering unit for determining filtering degree on the basis of two or more driving modes, and filtering the noise frequency according to the filtering degree; and a reactive torque calculation unit for calculating reactive torque on the basis of the filtered noise frequency.

19 Claims, 14 Drawing Sheets

(56) References Cited

U.S. PATENT DOCUMENTS

| | | |
|---|---|---|
| 2006/0037806 A1 | 2/2006 | Kasahara |
| 2010/0152952 A1 | 6/2010 | Lee |
| 2010/0292888 A1* | 11/2010 | Taguchi ................ B60W 10/06 |
| | | 701/31.4 |
| 2015/0224845 A1* | 8/2015 | Anderson ................ F03G 7/08 |
| | | 701/37 |
| 2019/0002022 A1 | 1/2019 | Kim |
| 2020/0283062 A1* | 9/2020 | Kudo ..................... B62D 5/006 |

FOREIGN PATENT DOCUMENTS

| | | |
|---|---|---|
| CN | 107364490 A | 11/2017 |
| JP | 2002160660 A | 6/2002 |
| JP | 2002-234454 A | 8/2002 |
| JP | 2004034928 A | 2/2004 |
| JP | 2008090941 A | 4/2008 |
| JP | 2010264842 A | 11/2010 |
| JP | 6308342 B1 | 4/2018 |
| KR | 20050046726 A | 5/2005 |

OTHER PUBLICATIONS

Study on EPS Control Based on Signals Filter and Dynamic Compensation.
Phase-domain filtering pick-up method for roll eccentricity compensation control.
Notice of Allowance issued in Chinese Patent Application No. 2020800612552 dated April 4, 2024.

* cited by examiner

<br>

STEERING CONTROL DEVICE, STEERING CONTROL METHOD, AND STEERING SUPPORT SYSTEM INCLUDING SAME

CROSS REFERENCE TO RELATED APPLICATIONS

This application is a National Stage of International Application No. PCT/KR2020/011382 filed Aug. 26, 2020, claiming priority to Korean Patent Application No. 10-2019-0107020 filed Aug. 30, 2019, the disclosures of which is incorporated herein by reference in its entirety.

TECHNICAL FILED

The present disclosure relates to a steering control device and method, and a steering assistance system with the same.

BACKGROUND ART

In general, an electric power steering system (EPS) is provided in a vehicle to easily steer a steering wheel, and the EPS assists a driver's steering force by using the rotational force of a motor.

The EPS includes an electronic control unit (ECU) which controls the driving of the motor when steering the steering wheel, and the ECU receives signals from a steering angle sensor, a torque sensor, a vehicle speed sensor, and an engine speed sensor to calculate a current value, and provides the current to the motor to adjust the steering feel of the steering wheel. Accordingly, in the low-speed section, the steering feeling may be relatively light by increasing the current value, and in the high-speed section, the steering feeling may be relatively heavy by decreasing the current value, so that the vehicle can be driven safely.

Recently, in order to satisfy the driver's various preferences, a plurality of steering modes are preset, and the driver can select a desired steering mode from among the plurality of steering modes to drive the vehicle.

Steering modes that are currently mainly provided include a sports mode, a normal mode, a comfort mode, and the like. The normal mode is a mode which provides a steering feeling for a normal driving state, the sports mode is a mode that provides a heavier steering feeling than the normal mode, and the comfort mode is a mode that provides a lighter steering feeling than the normal mode.

Meanwhile, if the vehicle travels on a road surface in various conditions, vibration or noise that may be generated by the road surface and the wheels may be transferred to the driver through the EPS. Therefore, the EPS system may provide a comfortable riding comfort to the driver by filtering noise generated by the road surface.

However, in the case that the driver prefers to feel the road condition naturally, if the EPS system removes all noise, there may not satisfy the requirement of the driver. Accordingly, there is a demand for a technology for providing an appropriate feedback for the state of the road surface according to the driving mode.

DETAILED DESCRIPTION OF INVENTION

Technical Problem

In this background, an object of the present disclosure is to appropriately provide a steering feeling to a driver by differently setting a degree of feedback for a road surface condition according to a driving mode.

In addition, an object of the present disclosure is to selectively provide driving stability, driving convenience, and natural steering feeling according to a selection of a driver.

Technical Solution

In order to solve the above problems, in one aspect, the present disclosure provides a steering control device, which filters a noise transmitted from a road surface to a wheel and calculates a reactive torque, including a noise frequency calculator configured to calculate a noise frequency of the noise transmitted to the wheel, a noise frequency filter configured to determine a filtering degree based on two or more driving modes, and filter the noise frequency according to the filtering degree, and a reactive torque calculator configured to calculate the reactive torque based on the filtered noise frequency.

In another aspect, the present disclosure provides a steering control method for filtering a noise transmitted from a road surface to a wheel and calculating a reactive torque, including calculating a noise frequency of the noise transmitted to the wheel, determining a filtering degree based on two or more driving modes, and filtering the noise frequency according to the filtering degree, and calculating the reactive torque based on the filtered noise frequency.

Advantageous Effects

According to an embodiment of the present disclosure, it is possible to appropriately provide a steering feeling to a driver by differently setting a degree of feedback for a road surface condition according to a driving mode.

In addition, according to an embodiment of the present disclosure, it is possible to selectively provide driving stability, driving convenience, and natural steering feeling according to a selection of a driver.

MODE FOR DISCLOSURE

Hereinafter, it will be described embodiments of the present disclosure in detail with reference to exemplary drawings. Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that an element "is connected to", "is coupled to", or "contacts" the other element, it should be interpreted that, not only can the element is directly connected to, directly coupled to, or directly contact the other element, but another element can also be interposed between the element and the other element.

Figure 1:
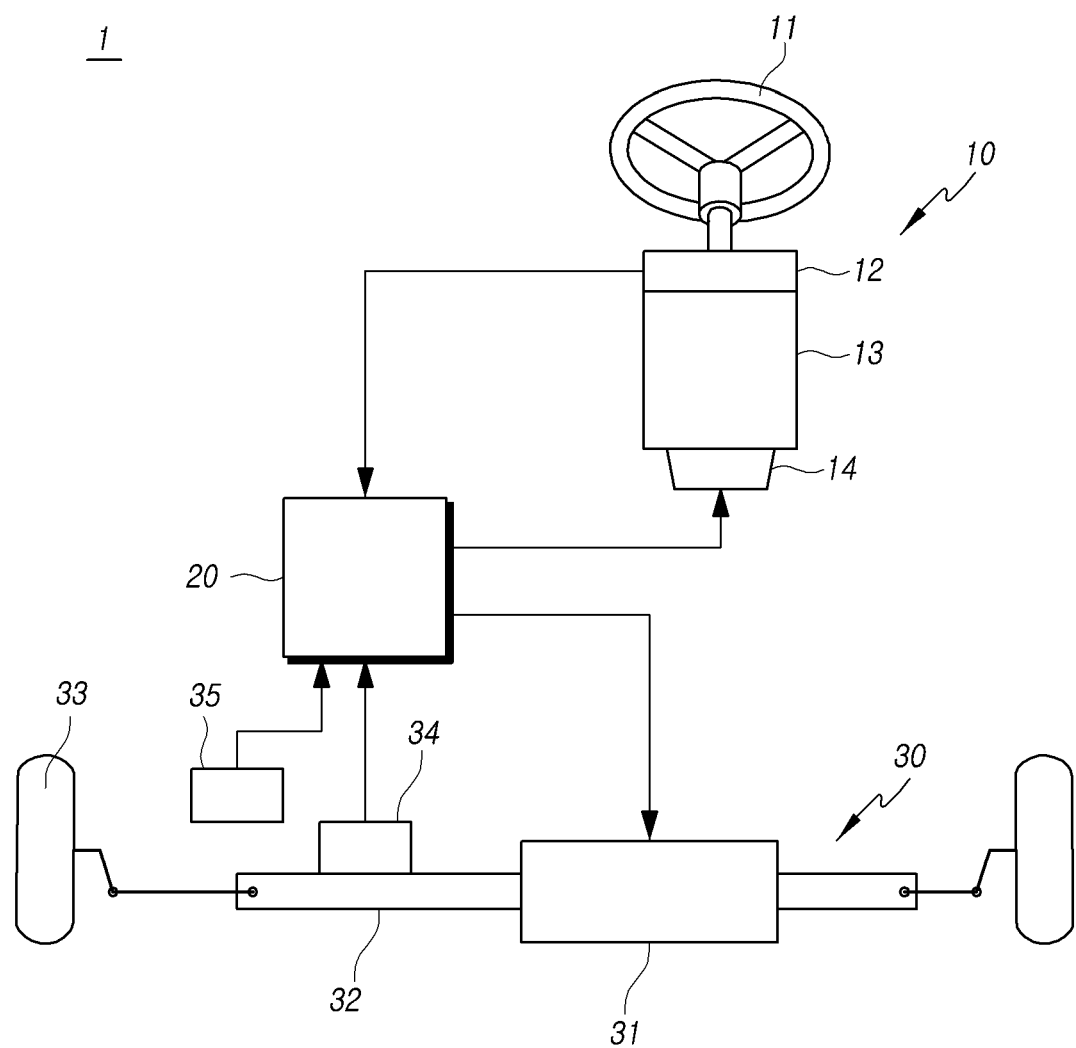
FIG. 1 is a diagram schematically illustrating a steering assistance system according to the present disclosure.

FIG. 1 is a diagram schematically illustrating a steering assistance system 1 according to the present disclosure.

FIG. 1 is a diagram schematically illustrating a steering assistance system 1 according to the present disclosure.

Referring to FIG. 1, a steering assistance system 1 according to the present disclosure may refer to a system that assists the steering force so that the driver can easily steer.

The steering assistance system 1 may be, according to a driving method, a hydraulic power steering (HPS) type providing steering assistance power by turning a pump to generate hydraulic pressure, or an electric power steering system (EPS) type providing steering assistance power by driving a motor. Hereinafter, the present disclosure will be described with reference to a steering assistance system of an electric power steering type for convenience, but the present disclosure is not limited thereto.

Meanwhile, depending on whether a steering input device 10 and a steering output device 30 are coupled by a mechanical connection member (or linkage), the steering assistance system may be a mechanical steering assistance system in which a force (torque) generated by the driver rotating the steering wheel 11 is transmitted to an actuator on the side of the wheel 33 through a mechanical power transmission device (e.g., a linkage, etc.) to steer the wheel 33, or a steer-by-wire (SbW) system that transmits power by transmitting receiving electrical signals through wires or cables instead of mechanical power transmission devices. Hereinafter, the steering assistance system 1 will be described based on the SbW system, but is not limited thereto.

The steering assistance system 1 according to the present disclosure may include a steering input device 10, a steering control device 20, a steering output device 30, and the like. As described above, in the case that the steering assistance system 1 is a SbW system, the steering input device 10 and the steering output device 30 are mechanically separated.

The steering input device 10 may refer to a device to which steering information intended by a driver is input. The steering input device 10 may include a steering wheel 11, a steering angle sensor 12, a column 13, a reaction force motor 14, a driver torque sensor, and the like.

The steering angle sensor 12 may detect a steering angle generated by the rotation of the steering wheel 11. Specifically, if the driver rotates while holding the steering wheel 11, the steering angle sensor 12 detects the rotation angle (steering angle) of the steering wheel 11, and output a detection signal (or a detection value) indicating the detected steering angle to the steering control device 20.

The column 13 may be connected to the steering wheel 11 and support the steering angle sensor 12, the reaction force motor 14, the driver torque sensor, and the like.

The reaction force motor 14 may apply a reactive force to the steering wheel 11 by receiving a control signal, a command signal, a command current, and the like from the steering control device 20. Specifically, the reaction force motor 14 may receive a command current from the steering control device 20, and may be driven at a rotation speed indicated by a command current to output a reactive torque.

The driver torque sensor (not shown) may detect a driver torque generated by rotation of the steering wheel 11. Specifically, if the driver rotates while holding the steering wheel 11, the driver torque sensor may detect the driver torque of the steering wheel 11, and transmit a detection signal (or detection value) indicating the detected driver torque to the steering control device 20. Here, the driver torque may mean a torque generated by the driver's manipulation of the steering wheel 11.

The steering control device 20 may receive steering information from the steering input device 10, calculate a control value, and output an electrical signal indicating the control value to the steering output device 30. Here, the steering information may mean information including at least one of a steering angle and a driver torque.

Meanwhile, the steering control device 20 may receive the power information actually output from the steering output device 30 as feedback, calculate a control value, and output an electrical signal indicating the control value to the steering input device 10, so that it is possible to provide a steering feeling to the driver.

Such a steering control device 20 may be implemented as an electronic control device such as an electronic control unit (ECU), a microcomputer (micom), and the like, and a detailed description of the steering control device 20 will be described later.

The steering output device 30 may refer to a device that drives the actual vehicle to steer according to the intention of the driver. The steering output device 30 may include a steering motor 31, a rack 32, a rack position sensor 34, a wheel 33, a vehicle speed sensor 35, and the like.

The steering motor 31 may move the rack 32 in the axial direction. Specifically, the steering motor 31 may be driven in response to receive a command current from the steering control device 20, and may cause the rack 32 to linearly move in the axial direction.

The rack 32 may be linearly moved by driving the steering motor 31, and the wheel 33 is steered left or right through the linear movement of the rack 32.

The rack position sensor 34 may detect the position of the rack 32. Specifically, if the rack 32 performs a linear motion and moves from a position corresponding to a neutral position of the steering wheel 11, the rack position sensor 34 may detect the actual position of the rack 32, and may output a detection signal indicating the position detection value of the rack 32 to the steering control device 20.

Here, the rack position sensor 34 may detect the actual moving speed of the rack 32. That is, the rack position sensor 34 may detect the position of the rack 32, calculate the moving speed of the rack 32 by differentiating the detected position of the rack 32 with respect to time, and output a detection signal indicative of the moving speed value of the rack 32 to the steering control device 20. Accordingly, the rack position sensor 34 may further include a differentiator.

The vehicle speed sensor 35 may detect the driving speed of the vehicle. Specifically, the vehicle speed sensor 35 may detect the driving speed of the vehicle and output a detection signal indicating the driving speed to the steering control device 20.

Although not shown, the steering assistance system 1 according to the present disclosure may further include a pinion gear, a steering angle sensor for detecting the steering angle of the wheel 33, a yaw rate sensor for detecting the heading angle of the vehicle, a clutch capable of separating or connecting the steering input unit and the steering output unit.

Meanwhile, in the case that the steering assistance system 1 according to the present disclosure is an SbW system, since the steering input device 10 and the steering output device 30 are electrically connected instead of a mechanical linkage, the steering assistance system 1 may appropriately provide a steering feeling to the driver by reflecting the condition of the road surface in the reactive torque.

Meanwhile, the condition of the road surface may correspond to noise. In this case, the steering assistance system 1 according to the present disclosure may filter the noise transmitted to the wheels so that the driver does not feel vibrations, shocks, etc. generated on the road surface.

However, if the driver manually drives by selecting a specific driving mode, such as a sports mode, there may be cases where the driver wants to properly feel the road surface condition. In this case, if all the noise transmitted to the wheels is filtered, the driver may not be able to properly feel the condition of the road surface (e.g., vibration). Therefore, it is required to differently reflect the road surface condition according to the driving mode.

Hereinafter, it will be described the steering control device 20 capable of providing a natural steering feeling to the driver by appropriately reflecting the noise corresponding to the condition of the road surface according to the above-described driving mode in detail.

Figure 2:
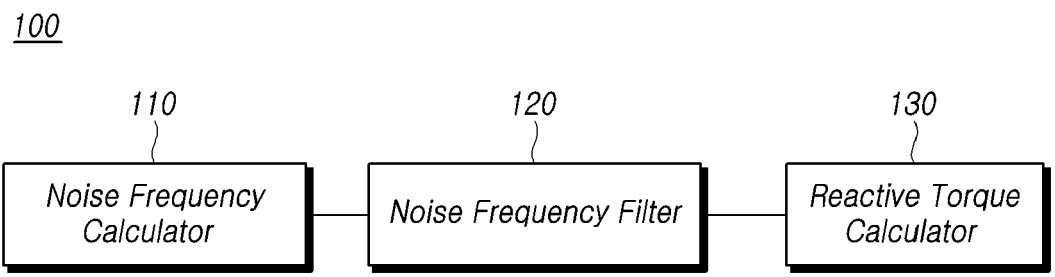
FIG. 2 is a block diagram illustrating a steering control device according to the present disclosure.

FIG. 2 is a block diagram illustrating a steering control device 100 according to the present disclosure.

Referring to FIG. 2, the steering control device 100 according to the present disclosure may calculate the reactive torque by filtering noise transmitted from the road surface to the wheels. The steering control device 100 may include a noise frequency calculator 110, a noise frequency filter 120, a reactive torque calculator 130, and the like.

The noise frequency calculator 110 may calculate a noise frequency of noise transmitted to the wheel. Specifically, the noise frequency calculator 110 may compare a rotation speed of the wheel with a target rotation speed, and calculate the noise frequency based on the comparison result.

Here, the target rotation speed may mean an expected vehicle speed when the driver operates an accelerator or the like. This target rotation speed may be calculated by an acceleration control device (not shown) included in the vehicle and controlling the acceleration of the vehicle. Accordingly, the target rotation speed may be calculated by the acceleration control device and input to the noise frequency calculator 110.

For example, the noise frequency calculator 110 may receive the rotation speed of the wheel 33 detected by the vehicle speed sensor 35 and the target rotation speed calculated by the acceleration control device (not shown), calculate a difference value between the rotation speed of the wheel 33 and the target rotation speed, and calculate a noise frequency corresponding to the difference value using a preset or stored table or map.

The present disclosure describes a method of calculating a noise frequency using the rotation speed of the wheel 33, but this is only an example and is not limited thereto.

Here, the noise frequency may refer to a frequency corresponding to vibration or the like occurring between the road surface and the wheels. These noise frequencies may mean all frequencies included in a predetermined frequency band. Meanwhile, the noise frequency may be a relatively high frequency band.

The noise frequency filter 120 may determine a filtering degree based on two or more driving modes, and filter the noise frequency according to the filtering degree.

Here, the driving mode may mean a mode defined according to driving characteristics. For example, driving modes may include a normal mode, a comfort mode capable of minimizing noise to enable quieter driving, a sports mode capable of maintaining a relatively high RPM than other modes to enables dynamic driving by increasing acceleration performance, and an eco-mode capable of maximizing the fuel economy of the vehicle, however, are not limited thereto.

Here, the filtering degree may mean a degree to which a noise frequency is filtered, which may be expressed as a ratio, a percentage (%), or the like. For example, if the filtering degree is 100%, all noise frequencies are removed, and if the filtering degree is 50%, half of the frequency bands as the noise frequency are removed, and if the filtering degree is 10%, only a part of the frequency band of the noise frequency is removed. The filtering degree may be determined according to the driving mode, and the filtering degree may also be different if the driving mode is different.

Here, the noise frequency filter 120 may set a variable filter corresponding to the filtering degree determined according to the current driving mode of the vehicle, and may filter the noise frequency.

For example, if the driving mode includes a normal mode, a comfort mode, and a sports mode that are classified according to driving characteristics, the noise frequency filter 120 may set a variable filter corresponding to the filtering degree determined according to the driving mode which is one of the normal mode, the comfort mode and the sports mode, and filter the noise frequency using the variable filter.

The reactive torque calculator 130 may calculate the reactive torque based on the filtered noise frequency. Specifically, the reactive torque calculator 130 may receive the rack force of the steering output device 30, the rack position value of the rack position sensor 34, and the noise frequency filtered according to the driving mode, and may calculate the reactive torque by substituting the rack force, the rack position value and the noise frequency into a reactive torque generating algorithm.

Meanwhile, the steering control device 100 according to the present disclosure may determine whether to perform the above-described operation, that is, the operation of determining the filtering degree differently according to the driving mode, according to whether of receiving a command signal or command information input from the outside.

For example, if a first signal is input to the noise frequency filter 120, the noise frequency filter 120 differently determines the filtering degree of the noise frequency based on the driving mode.

As another example, if a second signal is input to the noise frequency filter 120, the noise frequency filter 120 determines the same filtering degree regardless of the driving mode.

The above-described first signal and second signal may be generated by a switch or the like. Hereinafter, it will be described an example of a switch for performing a command to change the operation of the noise frequency filter 120.

Figure 3:
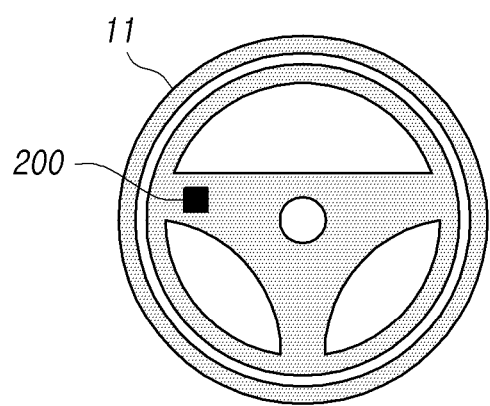
FIG. 3 is a diagram illustrating an embodiment of a switch according to the present disclosure.

FIG. 3 is a diagram illustrating an embodiment of a switch 200 according to the present disclosure.

Referring to FIG. 3, a switch 200 according to the present disclosure may change the operation of the noise frequency filter 120 by operating in response to a user input such as a driver's input. Specifically, if a user such as a driver operates the switch 200, the switch 200 may output a first signal. In addition, if the user manipulates the switch 200 again after the first signal is output, the switch 200 may output the second signal.

Here, the first signal and the second signal may mean signals for changing the operation of the noise frequency filter 120.

The switch 200 may be disposed at a specific position of the steering wheel 11, as shown in FIG. 3, however, is not limited thereto, and the position at which the switch 200 is disposed may be a position other than the steering wheel 11, which can be easily manipulated by the driver.

The switch 200 may be implemented as a physical button, but is not limited thereto, and may be implemented as a device capable of recognizing touch, voice, gaze, and the like.

Meanwhile, the first signal and the second signal generated by the user such as a driver operating the switch 200 may be input to the noise frequency filter 120. In this case, if the noise frequency filter 120 receives the first signal, the noise frequency filter 120 may determine different filtering degrees of the noise frequency based on the driving mode as described above with reference to FIG. 2. Conversely, if the noise frequency filter 120 receives the second signal, the noise frequency filter 120 may determine the same filtering degree regardless of the driving mode.

As described above, the steering control device 100 according to the present disclosure may selectively provide driving stability, driving convenience, and natural steering feeling according to the driver's selection of the operation.

Hereinafter, it will be described a method of differently filtering the noise frequency according to driving modes in detail.

Figure 4:
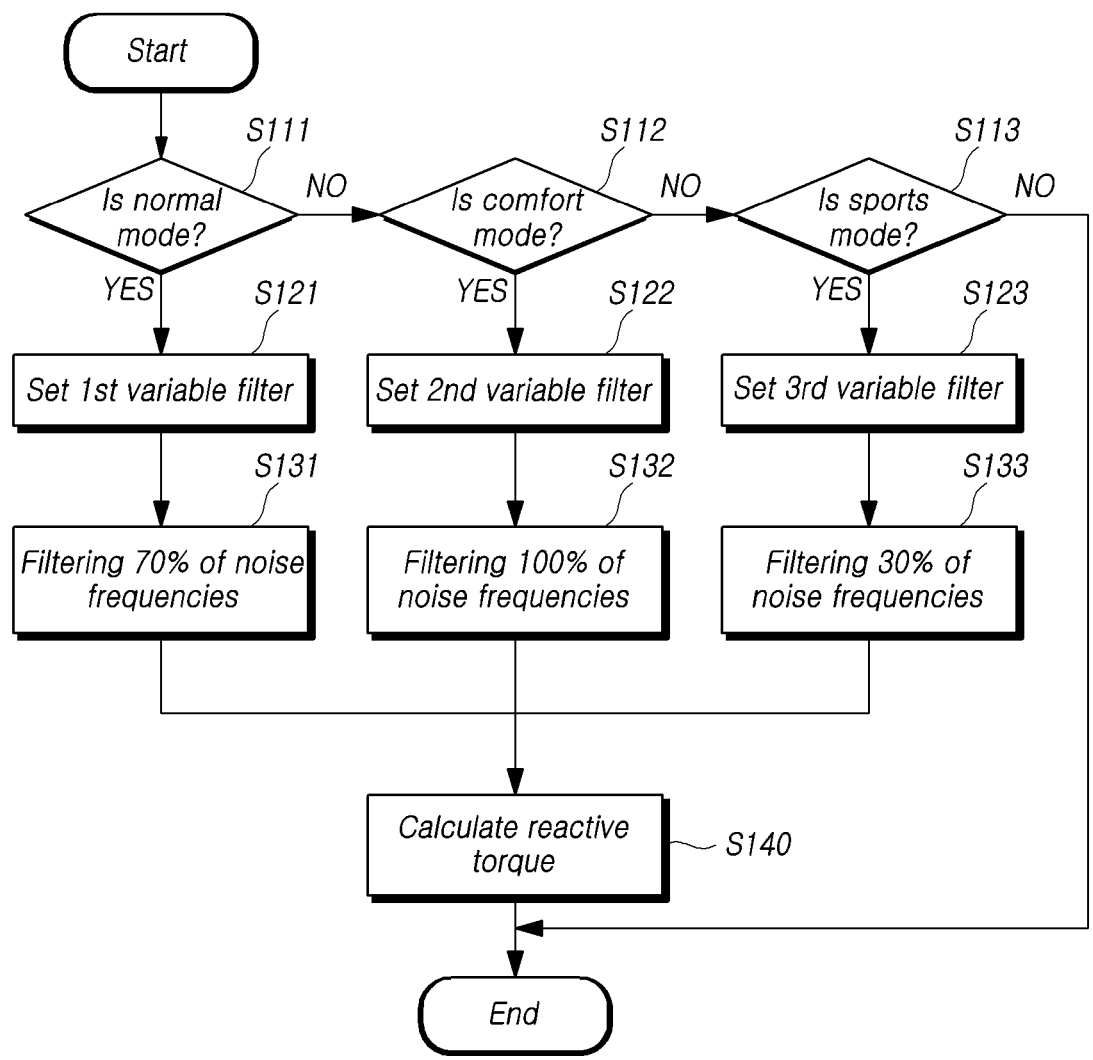
FIG. 4 is a flowchart for explaining a first embodiment of filtering a noise frequency according to the present disclosure.

FIG. 4 is a flowchart for explaining a first embodiment of filtering a noise frequency according to the present disclosure.

Referring to FIG. 4, the steering control device 100 according to the present disclosure may determine whether the current driving mode is the normal mode (S111).

If the current driving mode is the normal mode (S111—Yes), the steering control device 100 may set a first variable filter corresponding to the normal mode (S121). Here, the first variable filter may refer to a filter capable of filtering a noise frequency by a first filtering degree. In this case, the first filtering degree may be about 70%, but is not limited thereto, and may be adjusted within a preset range.

For example, if the driving mode is the normal mode, the noise frequency filter 120 may set the first variable filter for filtering by the first filtering degree.

If the first variable filter is set, the steering control device 100 may filter the noise frequency by the first filtering degree, for example, about 70% by using the first variable filter (S131).

Meanwhile, if the current driving mode is not the normal mode (S111—No), the steering control device 100 may check whether the current driving mode is the comfort mode (S112).

If the current driving mode is the comfort mode (S112—Yes), the steering control device 100 may set a second variable filter corresponding to the comfort mode (S122). Here, the second variable filter may refer to a filter capable of filtering the noise frequency by a second filtering degree. In this case, the second filtering degree may be set to be greater than the first filtering degree, and may preferably be about 100%, but is not limited thereto, and may be adjusted within a preset range.

For example, if the driving mode is the comfort mode, the noise frequency filter 120 may set a second variable filter for filtering by a second filtering degree greater than the first filtering degree.

If the second variable filter is set, the steering control device 100 may filter the noise frequency by the second filtering degree, for example, 100% by using the second variable filter (S132).

Meanwhile, if the current driving mode is not the normal mode and the comfort mode (S112—No), the steering control device 100 may determine whether the current driving mode is the sports mode (S113).

If the current driving mode is not the normal mode, the comfort mode, and the sports mode, the current driving mode may be an eco-mode or other driving mode, and the steering control device 100 may terminate the operation. Meanwhile, although not shown, the steering control device 100 may repeatedly check the driving mode until the current driving mode satisfies the normal mode, the comfort mode, or the sports mode.

If the current driving mode is the sports mode (S113—Yes), the steering control device 100 may set a third variable filter corresponding to the sports mode (123). Here, the third variable filter may refer to a filter capable of filtering the noise frequency by a third filtering degree. In this case, the third filtering degree may be set smaller than the first filtering degree, and may preferably be about 30%, but is not limited thereto, and may be adjusted within a preset range.

For example, if the driving mode is the sports mode, the noise frequency filter 120 may set the third variable filter for filtering by a third filtering degree smaller than the first filtering degree.

If the third variable filter is set, the steering control device 100 may filter the noise frequency by the third filtering degree, for example, about 30% by using the third variable filter (S133).

Here, the variable filter may be, for example, a low pass filter (LPF), a high pass filter (HPF), or a band pass filter (BPF), but is limited thereto. The first and second variable filters may be different types of filters, or they may all be the same type of filters.

Here, each of the LPF and HPF may be a filter including a variable cutoff frequency, and the BPF may be a filter in which at least one of a center frequency and a bandwidth is variable.

If all or part of the noise frequency is filtered, the steering control device 100 may calculate the reactive torque by using the filtered noise frequency, the rack force, or the like (S140).

Meanwhile, the driving mode of the vehicle is checked in the order of normal mode, comfort mode, and sports mode as shown in FIG. 4, but this is only an example for explaining the present disclosure, and is not limited thereto.

The order of checking may be changed according to the design intention of the designer.

As described above, the variable filter may be any one of LPF, HPF, and BPF. Hereinafter, it will be described an embodiment of filtering the noise frequency using the LPF in detail.

Figure 5:
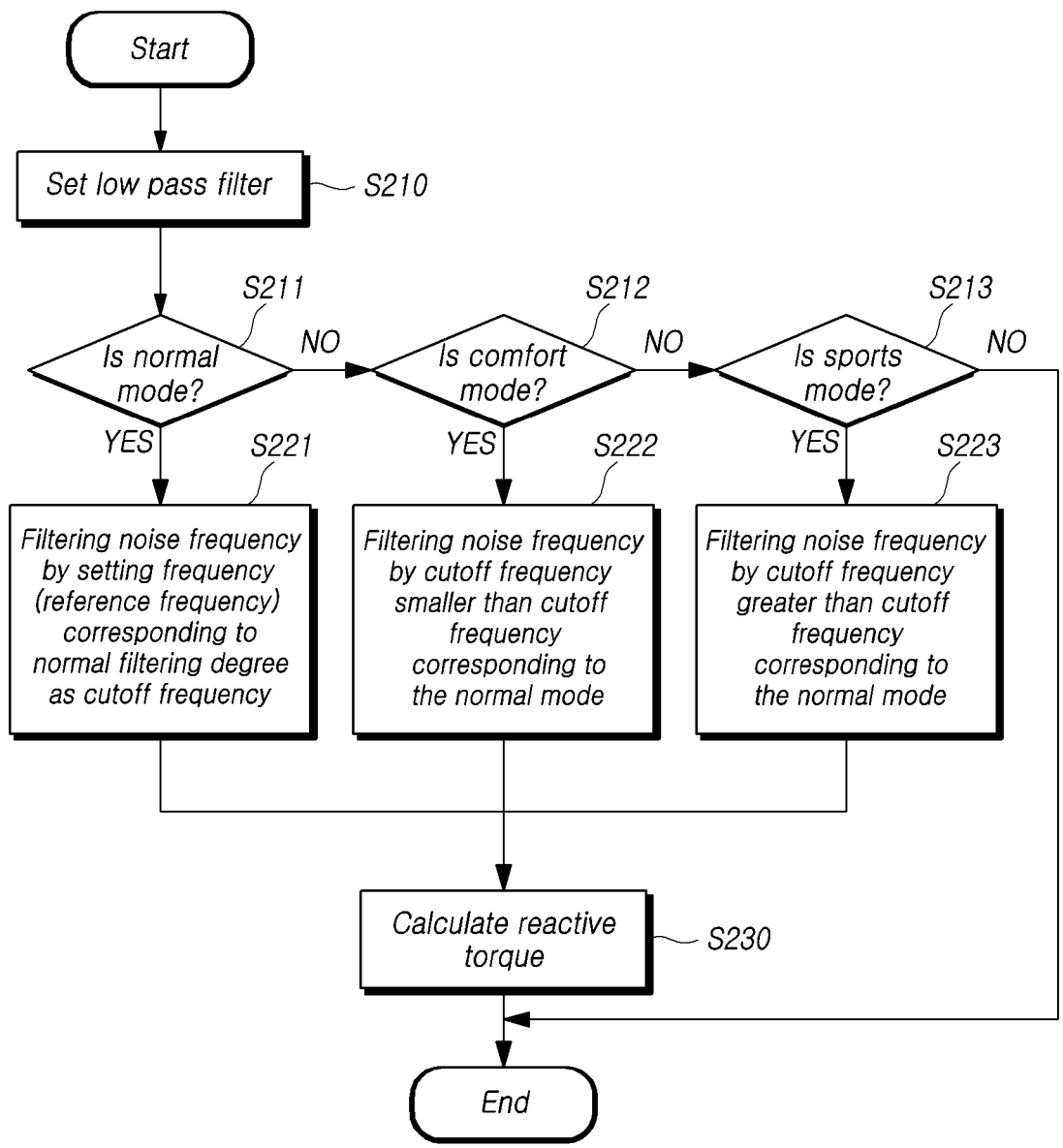
FIG. 5 is a flowchart for explaining a second embodiment of filtering a noise frequency according to the present disclosure.
Figure 6:
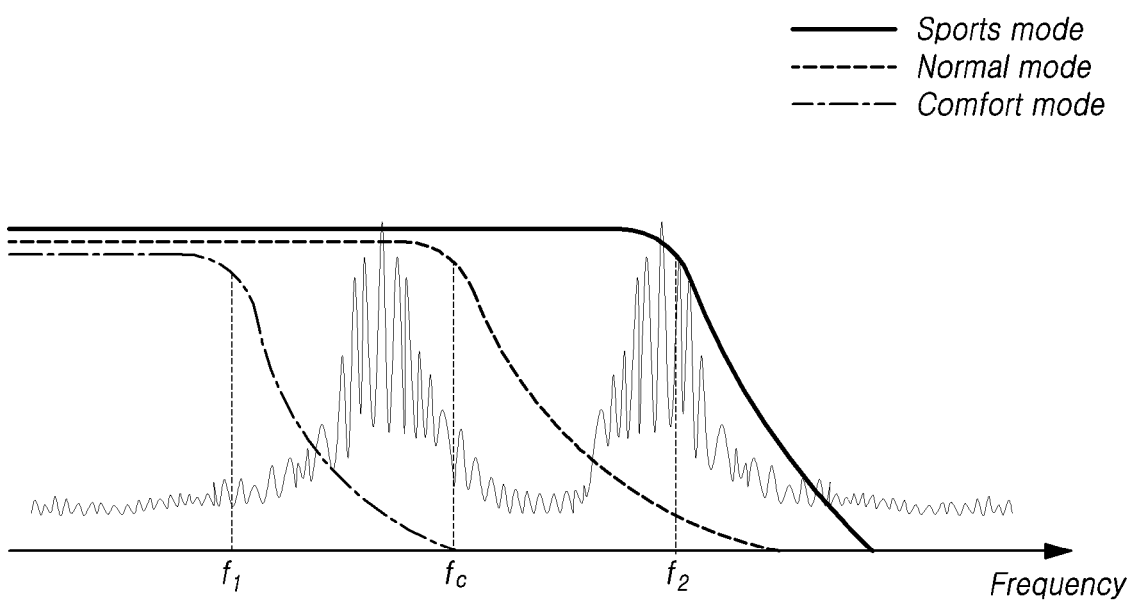
FIG. 6 is a graph schematically illustrating a characteristic of a low pass filter according to a driving mode.

FIG. 5 is a flowchart for explaining a second embodiment of filtering a noise frequency according to the present disclosure, and FIG. 6 is a graph schematically illustrating a characteristic of a low pass filter according to a driving mode.

Referring to FIG. 5, the steering control device 100 according to the present disclosure may set the variable filter as a low pass filter (S210).

Specifically, the variable filter is a low pass filter including a first cutoff frequency, and the first cutoff frequency may be changed to a frequency corresponding to a filtering degree predetermined according to a driving mode.

Meanwhile, as described above with reference to FIG. 4, the steering control device 100 may determine whether the current driving mode is the normal mode (S211).

If the driving mode is the normal mode (S21—Yes), the steering control device 100 may set a frequency, that is, a reference frequency fo, corresponding to the normal filtering degree in the normal mode as the first cutoff frequency, and may filter the noise frequency (S221).

If the driving mode is not the normal mode (S211—No), the steering control device 100 may determine whether the current driving mode is the comfort mode (S212).

If the driving mode is the comfort mode (S212—Yes), the steering control device 100 filters the noise frequency by setting a frequency corresponding to a comfort filtering degree in the comfort mode as a cutoff frequency. That is, the steering control device 100 may filter the noise frequency by setting a frequency smaller than the cutoff frequency corresponding to the normal mode used in steps S210 and S221 as the first cutoff frequency (S222).

If the driving mode is not the comfort mode (S212—No), the steering control device 100 may determine whether the current driving mode is the sports mode (S213).

If the driving mode is the sports mode (S213—Yes), the steering control device 100 may filter the noise frequency by setting a frequency corresponding to a sports filtering degree in the sports mode as a cutoff frequency. That is, the steering control device 100 may filter the noise frequency by using a higher frequency than the cutoff frequency corresponding to the normal mode used in steps S210 and S221 as the first cutoff frequency (S223).

If all or part of the noise frequency is filtered, the steering control device 100 may calculate a reactive torque using the filtered noise frequency, the rack force, or the like (S230).

As described above, based on a frequency corresponding to a normal filtering degree in the normal mode, the first cutoff frequency of the LPF may be changed to be smaller than the frequency corresponding to the normal filtering degree if the driving mode is the comfort mode, and may be changed to be greater than the frequency corresponding to the normal filtering degree if the driving mode is the sports mode.

That is, the first cutoff frequency of the LPF is changed and moved according to the driving mode, and as the overall shape of the LPF is moved, so that the range in which the noise frequency is filtered may be changed.

Referring to FIG. 6, for example, if the driving mode is the normal mode, the first cutoff frequency of the LPF is fc, and if the driving mode is the comfort mode, the first cutoff frequency of the LPF is a frequency f1 smaller than fc, and if the driving mode is the sports mode, the first cutoff frequency of the LPF is a frequency f2 higher than fc.

Accordingly, if the variable filter is LPF, in the case that the driving mode is the comfort mode, the filtering degree of noise frequency is greater than that of the normal mode, and in the case that the driving mode is the sports mode, the filtering degree of the noise frequency is smaller than in normal mode.

As described above, the steering control device 100 according to the present disclosure may provide various driving feeling to the driver by differently setting the degree of feedback of the road surface condition according to the driving mode.

Meanwhile, the steering control device 100 according to the present disclosure may filter a noise frequency using a variable filter that is an HPF. Hereinafter, an embodiment of filtering the noise frequency using the HPF will be described in detail.

Figure 7:
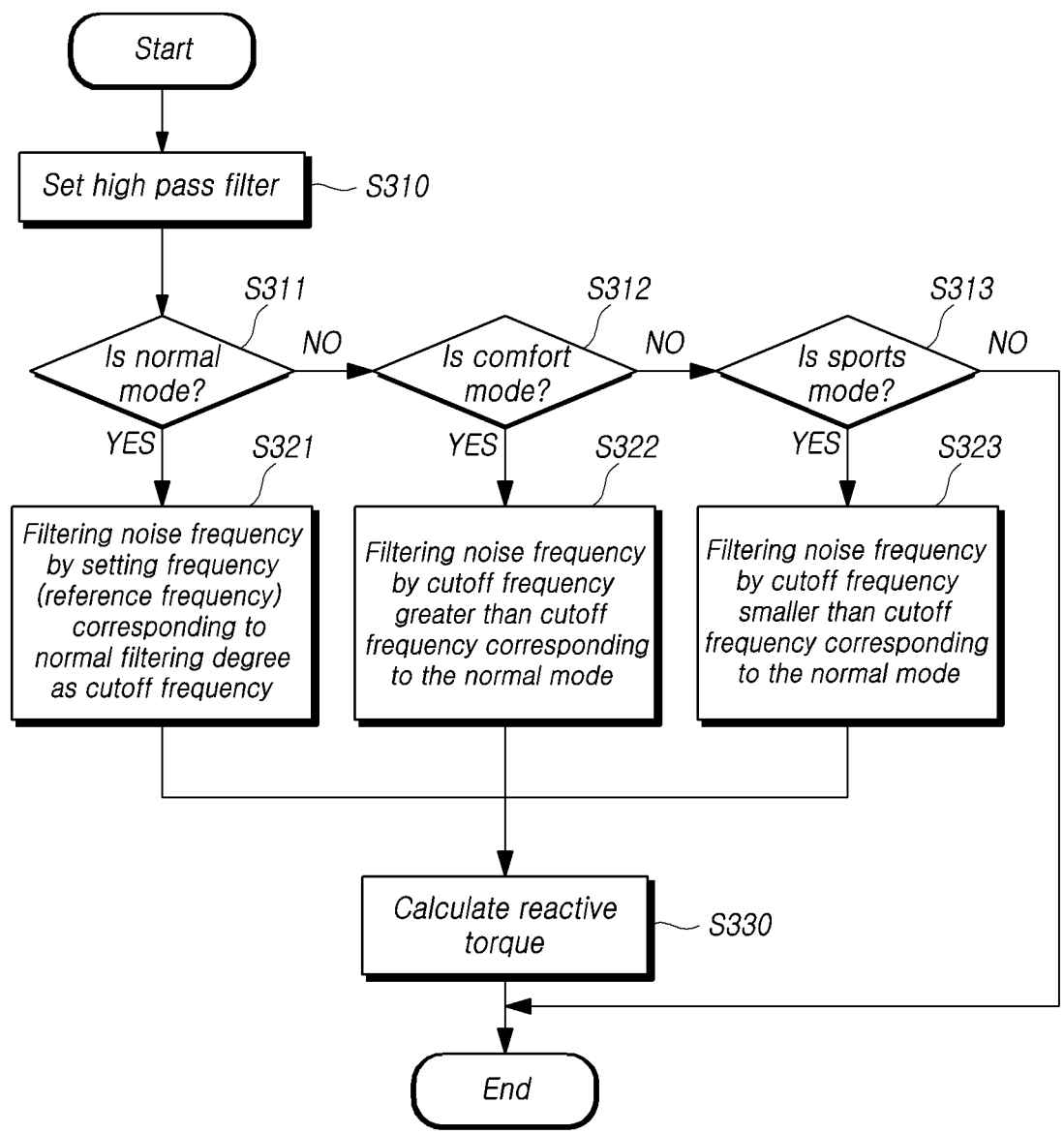
FIG. 7 is a flowchart for explaining a third embodiment of filtering a noise frequency according to the present disclosure.
Figure 8:
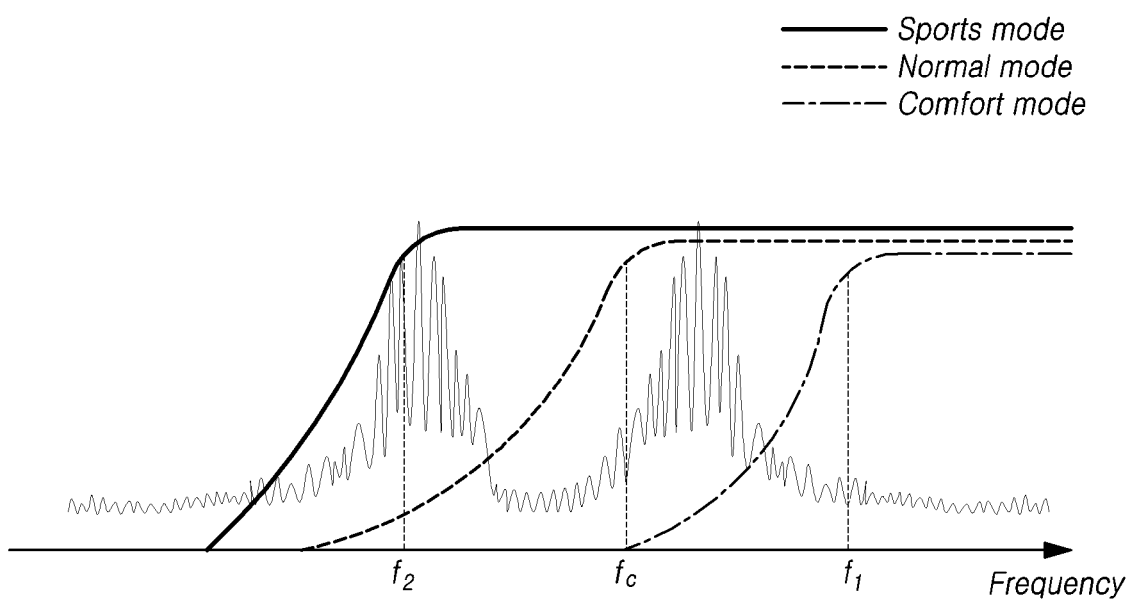
FIG. 8 is a graph schematically illustrating a characteristic of a high pass filter according to a driving mode.

FIG. 7 is a flowchart for explaining a third embodiment of filtering a noise frequency according to the present disclosure, and FIG. 8 is a graph schematically illustrating a characteristic of a high pass filter according to a driving mode.

Referring to FIG. 7, the steering control device 100 according to the present disclosure may set the variable filter as a high pass filter (S310).

Specifically, the variable filter may be a high pass filter including a second cutoff frequency, and the second cutoff frequency may be varied to a frequency corresponding to a filtering degree predetermined according to a driving mode.

Meanwhile, as described above with reference to FIGS. 4 and 5, the steering control device 100 may determine whether the current driving mode is the normal mode (S311).

If the driving mode is the normal mode (S311—Yes), the steering control device 100 may set a frequency, that is a reference frequency fc, corresponding to the normal filtering degree in the normal mode as a second cutoff frequency described above to filter the noise frequency (S321).

In the case that the driving mode is not the normal mode (311—No), the steering control device 100 may determine whether the current driving mode is the comfort mode (S312).

If the driving mode is the comfort mode (S312—Yes), the steering control device 100 may filter the noise frequency by setting a frequency corresponding to a comfort filtering degree in the comfort mode as a cutoff frequency. That is, the steering control device 100 may filter the noise frequency by using a higher frequency than the cutoff frequency corresponding to the normal mode used in steps S310 and S321 as the second cutoff frequency (S322).

If the driving mode is not the comfort mode (S312—No), the steering control device 100 may determine whether the current driving mode is the sports mode (S213).

If the driving mode is the sports mode (S313—Yes), the steering control device 100 may filter the noise frequency by setting a frequency corresponding to the sports filtering degree in the sports mode as a cutoff frequency. That is, the steering control device 100 may filter the noise frequency by using a frequency smaller than the cutoff frequency corresponding to the normal mode used in steps S310 and S321 as the second cutoff frequency (S223).

If all or part of the noise frequency is filtered, the steering control device 100 may calculate the reactive torque using the filtered noise frequency, the rack force, or the like (S330).

As described above, based on a frequency corresponding to a normal filtering degree in the normal mode, the second cutoff frequency of the HPF may be changed to be greater than the frequency corresponding to the normal filtering degree if the driving mode is the comfort mode, and may be changed to be smaller than the frequency corresponding to the normal filtering degree if the driving mode is the sports mode.

That is, the second cutoff frequency of the HPF is changed and moved according to the driving mode, and as the overall shape of the HPF is moved, so that the range in which the noise frequency is filtered may be changed.

Referring to FIG. 8, for example, in the case that the driving mode is the normal mode, the second cutoff frequency of the HPF is fc, if the driving mode is the comfort mode, the second cutoff frequency of the HPF is a frequency f1 smaller than fc, and if the driving mode is the sports mode, the second cutoff frequency of the HPF is a frequency f2 higher than fc.

Accordingly, if the variable filter is HPF, in the case that the driving mode is the comfort mode, the filtering degree of noise frequency is greater than that of the normal mode, and in the case that the driving mode is the sports mode, the filtering degree of the noise frequency is smaller than in normal mode.

As described above, the steering control device 100 according to the present disclosure may provide various driving feeling to the driver by differently setting the degree of feedback of the road surface condition according to the driving mode.

Meanwhile, the steering control device 100 according to the present disclosure may filter a noise frequency using a variable filter that is an BPF. Hereinafter, an embodiment of filtering the noise frequency using the BPF will be described in detail.

Figure 9:
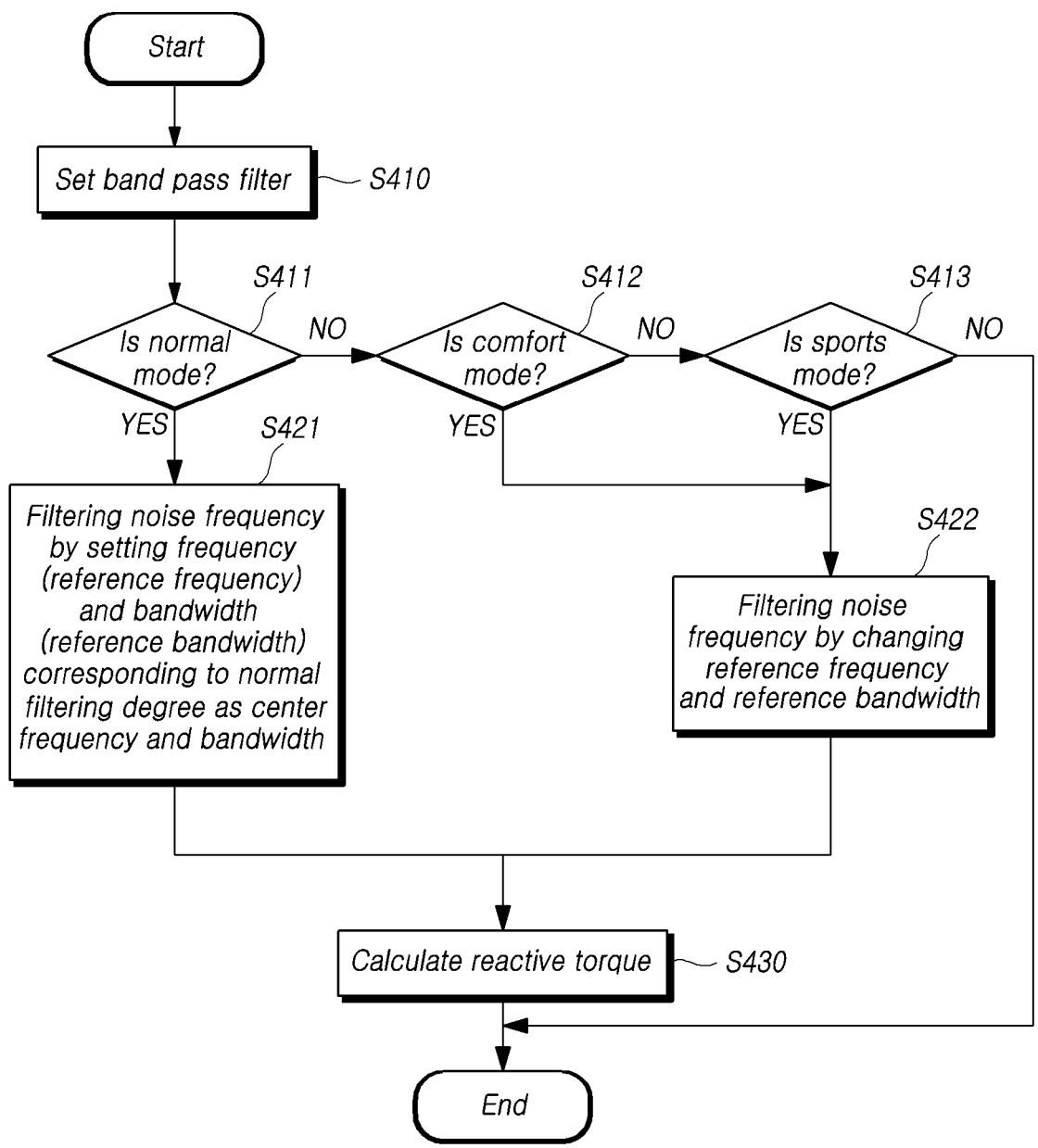
FIG. 9 is a flowchart for explaining a fourth embodiment of filtering a noise frequency according to the present disclosure.
Figure 10:
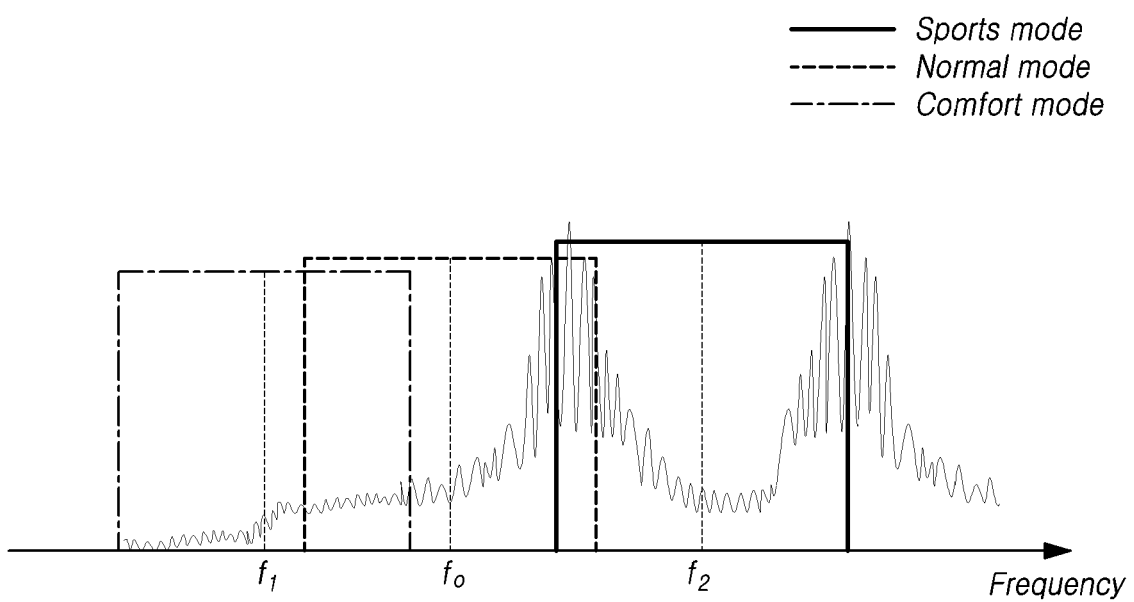
FIG. 10 is a first graph schematically illustrating a characteristic of a band pass filter according to a driving mode.

FIG. 9 is a flowchart for explaining a fourth embodiment of filtering a noise frequency according to the present disclosure, FIG. 10 is a first graph schematically illustrating a characteristic of a band pass filter according to a driving mode, and FIG. is a second graph schematically illustrating a characteristic of a band pass filter according to a driving mode.

Referring to FIG. 9, the steering control device 100 according to the present disclosure may set the variable filter as a band pass filter (S410).

Specifically, the variable filter is a band pass filter including a center frequency and a bandwidth, wherein at least one of the center frequency and the bandwidth may be varied based on a filtering degree predetermined according to the driving mode. That is, only the center frequency of the BPF may be varied, or only the bandwidth of the BPF may be varied, or both the center frequency and the bandwidth may be varied.

Meanwhile, as described above with reference to FIGS. 4, 5, and 7, the steering control device 100 may determine whether the current driving mode is the normal mode (S411).

If the driving mode is the normal mode (S411—Yes), the steering control device 100 may set a frequency, that is a reference frequency fo, and a bandwidth, that is a reference bandwidth B, corresponding to the normal filtering degree in the normal mode as the above-mentioned center frequency and bandwidth so as to filter the noise frequency (S421).

If the driving mode is not the normal mode (S411—No), the steering control device 100 may check whether the current driving mode is the comfort mode (S412), and if the current driving mode is not the comfort mode (S412—No), the steering control device 100 may determine whether the current driving mode is the sports mode (S413).

If the driving mode is the comfort mode or the sports mode (S412, S413, Yes), the steering control device 100 may change the center frequency and the bandwidth according to the driving mode, which is the comfort mode or the sports mode, so as to filter the noise frequency (S422).

Here, in changing the center frequency, if the driving mode is the comfort mode, since the noise frequency is required to be mostly removed, the center frequency may be changed so that the noise frequency is removed relatively more than in the normal mode. In addition, if the driving mode is the sports mode, since the noise frequency is required to hardly be removed the center frequency may be changed so that the noise frequency is removed relatively less than in the case of the normal mode.

This is, based on the frequency corresponding to the normal filtering degree in the normal mode, if the driving mode is the comfort mode or the sports mode, the center frequency may be changed to be smaller or larger than a frequency corresponding to the normal filtering degree. This will be described later with reference to FIG. 10.

Meanwhile, in changing the bandwidth, based on the bandwidth corresponding to the normal filtering degree in the normal mode, the bandwidth may be changed to be greater than the bandwidth corresponding to the normal filtering degree if the driving mode is the comfort mode, and may be changed to be smaller than the bandwidth corresponding to the normal filtering degree if the driving mode is the sports mode.

For example, if the driving mode is the comfort mode, the noise frequency filter 120 may set a BPF having a bandwidth greater than a bandwidth corresponding to the normal mode, and filter the noise frequency using the set BPF.

As another example, if the driving mode is the sports mode, the noise frequency filter 120 may sets a BPF having a smaller bandwidth than the bandwidth corresponding to the normal mode, and filter the noise frequency using the set BPF.

If all or part of the noise frequency is filtered, the steering control device 100 may calculate the reactive torque using the filtered noise frequency and rack force (S330).

As described above, the center frequency of the BPF may be changed or moved depending on the driving mode, and the overall shape of the BPF is moved, so that the range in which the noise frequency is filtered may be changed.

Referring to FIG. 10, for example, in the case of a BPF having the same bandwidth, the center frequency of the BPF corresponding to the normal mode is fo, and the center frequency of the BPF corresponding to the comfort mode is f1, which is a much smaller frequency than fo, and if the driving mode is the sports mode, the center frequency of the HPF is f2, which is a higher frequency than fo. In this case, f1 may be set to correspond to the filtering degree (e.g., 100%) according to the comfort mode, and f2 may be set to correspond to the filtering degree (e.g., 30%) according to the sports mode. Meanwhile, in FIG. 10, it is illustrated the case in which the center frequency f1 corresponding to the comfort mode as the driving mode is smaller than the center frequency fo corresponding to the normal mode, but the present disclosure is not limited thereto. If the filtering degree according to the comfort mode satisfies a condition greater than the filtering degree according to the normal mode, the center frequency f1 corresponding to the comfort mode may be greater than the center frequency f1 corresponding to the normal mode. This may also be applied to the case of the center frequency f2 corresponding to the sports mode.

Meanwhile, similar to the center frequency of the BPF, based on the normal mode, the bandwidth of the BPF may be also changed greater than the bandwidth corresponding to the normal mode if the driving mode is changed to the comfort mode, and may be changed smaller than the bandwidth corresponding to the normal mode if the driving mode is changed to the sports mode.

Figure 11:
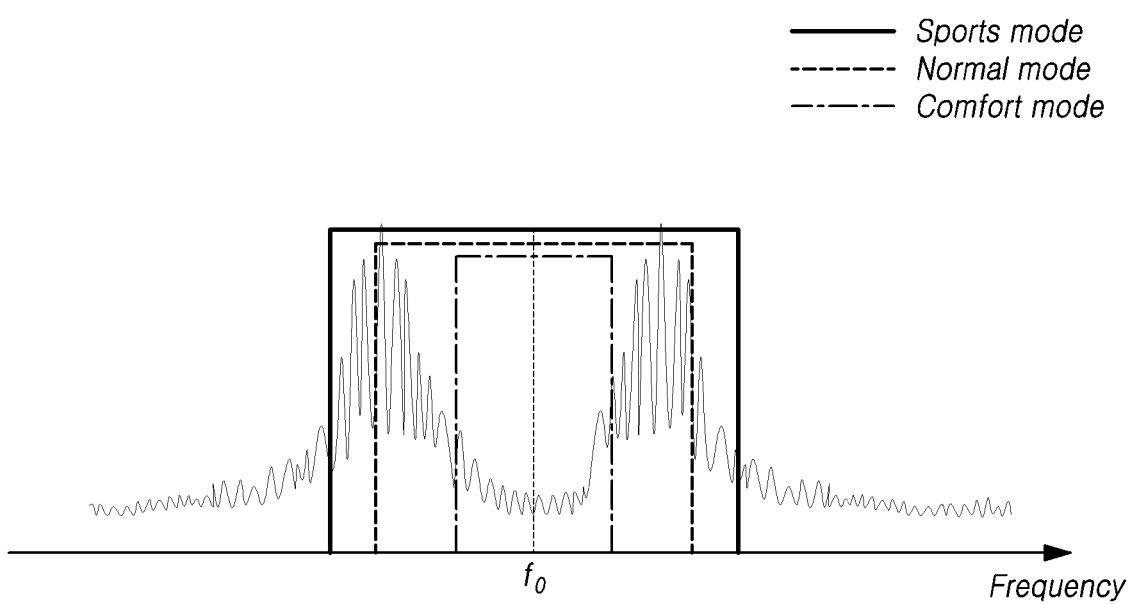
FIG. 11 is a second graph schematically illustrating a characteristic of a band pass filter according to a driving mode.

Referring to FIG. 11, for example, in the case of BPF having the same center frequency fo, the bandwidth of the BPF corresponding to the comfort mode may be narrower than the bandwidth of the BPF corresponding to the normal mode, and the bandwidth of the BPF corresponding to the sports mode may be wider than the bandwidth of the BPF corresponding to the normal mode.

As described above, the steering control device 100 according to the present disclosure may provide various driving feeling to the driver by setting different degrees of feedback of the road surface condition according to the driving mode.

Meanwhile, if the filtering degree is preset according to the driving mode, the driver may finely adjust the preset filtering degree according to each driving mode by using a tuner included in the vehicle.

Hereinafter, a tuner according to the present disclosure will be described.

Figure 12:
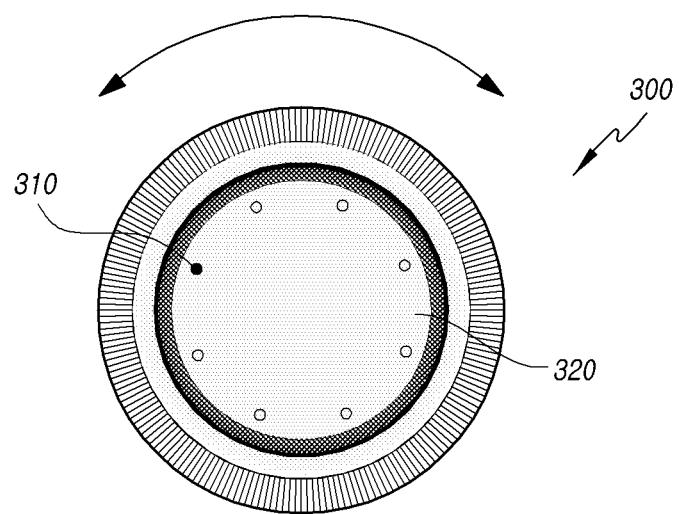
FIG. 12 is a diagram schematically illustrating a first embodiment of a tuner according to the present disclosure.
Figure 13:
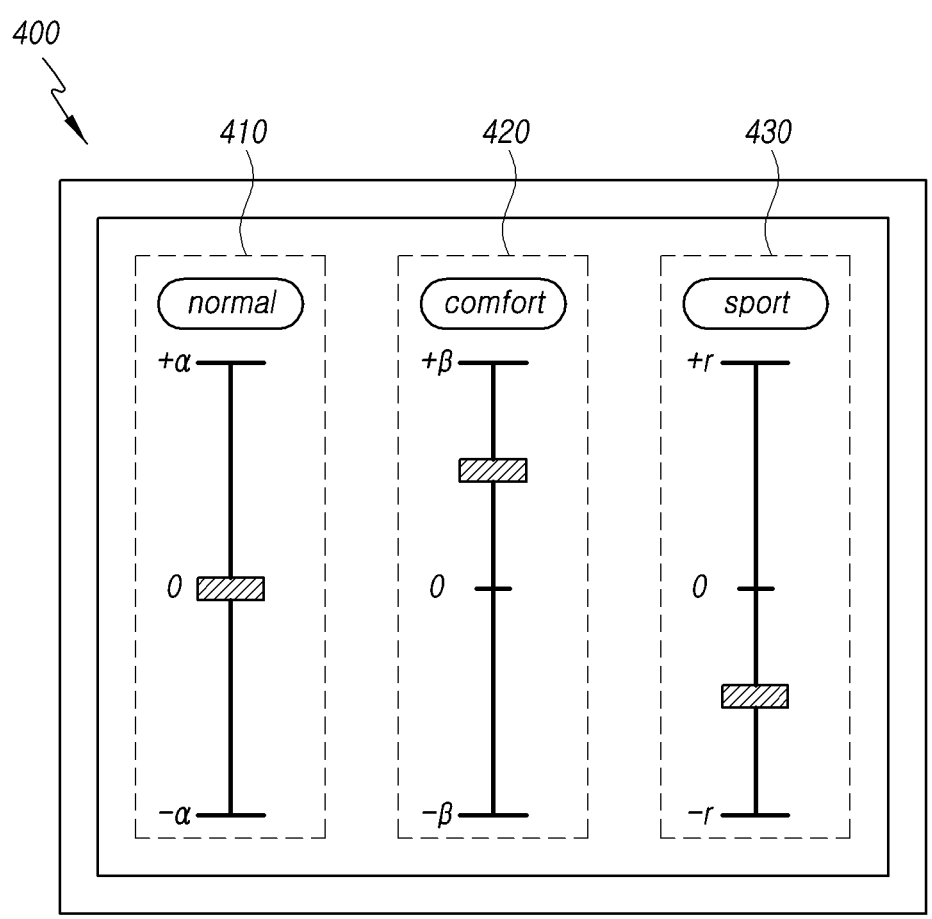
FIG. 13 is a diagram schematically illustrating a second embodiment of a tuner according to the present disclosure.

FIG. 12 is a diagram schematically illustrating a first embodiment of a tuner 300 according to the present disclosure, and FIG. 13 is a diagram schematically illustrating a second embodiment of a tuner 400 according to the present disclosure.

The tuners 300 and 400 according to the present disclosure may output a tuning signal corresponding to a tuning operation of a user such as a driver.

Such a tuner 300 may be implemented as a physical button such as a dial, as shown in FIG. 12. The tuner 300 shown in FIG. 12 may include a pointing point 310 indicating a value, a selection button 320, etc., and may be rotated clockwise or counterclockwise by a user such as a driver. A user such as a driver may designate a desired level of filtering by turning the tuner 300 shown in FIG. 12 with reference to the pointing point 310, and may finally determine by pressing the selection button 320.

Meanwhile, the tuner 400 according to the present disclosure may be implemented with a hardware configuration such as a touch panel and a display panel and a software configuration, as shown in FIG. 13. The tuner 400 illustrated in FIG. 13 may display icons 410, 420 and 430. A user such as a driver may display the filtering degree by touching the icons 410, 420 and 430 displayed on the screen. Here, the scales a, R, and y displayed on each icon 410, 420 and 430 may be set not to overlap with the filtering degree corresponding to each driving mode.

If a user such as a driver operates the tuners 300 and 400, the steering control device 100 may adjust a preset filtering degree for each driving mode according to a tuning signal input from the tuners 300 and 400.

For example, the noise frequency filter 120 may receive a tuning signal from the tuners 300 and 400 corresponding to a user's tuning operation, and may adjust the filtering degree according to the tuning signal.

As described above, according to the present disclosure, there may provide a more various driving feeling to the driver by adjusting the filtering degree according to the driver's selection.

Hereinafter, it will be described a steering control method capable of performing all of the present disclosure.

Figure 14:
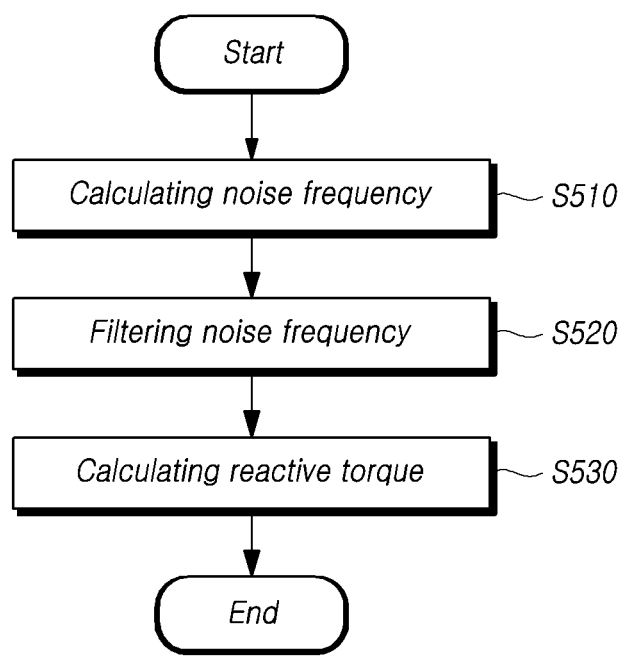
FIG. 14 is a flowchart illustrating a steering control method according to the present disclosure.

FIG. 14 is a flowchart illustrating a steering control method according to the present disclosure.

Referring to FIG. 14, the steering control method according to the present disclosure may calculate the reactive torque by filtering the noise transmitted to the wheel from the road surface. The steering control method may include a step S510 of calculating a noise frequency of noise transmitted to the wheels, a step S520 of determining a filtering degree of the noise frequency based on two or more driving modes and filtering the noise frequency according to the filtering degree, and a step S530 of calculating a reactive torque based on the filtered noise frequency.

Here, the driving mode includes a normal mode, a comfort mode, and a sports mode that are classified according to driving characteristics, and if the driving mode is any one of the normal mode, the comfort mode and the sports mode, the noise frequency filtering step (S520) sets a variable filter corresponding to the filtering degree determined according to the driving mode, and filters the noise frequency using the variable filter.

Here, in the noise frequency filtering step (S520), if the driving mode is the normal mode, a first variable filter for filtering by a first filtering degree is set, and if the driving mode is the comfort mode, a second variable filter for filtering by a second filtering degree greater than the first filtering degree is set, and if the driving mode is a sports mode, a third variable filter for filtering by a third filtering degree smaller than the first filtering degree is set.

The variable filter may be, for example, a low pass filter including a first cutoff frequency, and the first cutoff frequency may be changed to a frequency corresponding to a filtering degree predetermined according to a driving mode.

As another example, the variable filter may be a high pass filter including a second cutoff frequency, and the second cutoff frequency may be changed to a frequency corresponding to a filtering degree predetermined according to a driving mode.

As another example, the variable filter may be a band pass filter including a center frequency and a bandwidth, and at least one of the center frequency and bandwidth may be variable based on a filtering degree predetermined according to a driving mode.

As described above, according to the present disclosure, it is possible to appropriately provide a steering feeling to the driver by differently setting the degree of feedback of the road surface condition according to the driving mode.

In addition, according to the present disclosure, it is possible to selectively provide driving stability, driving convenience, natural steering feeling according to the driver's selection of the operation.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATION

This patent application claims priority in accordance with Article 119(a) of the U.S. Patent Law (35 USC § 119(a)) for Patent Application No. 10-2019-0107020 filed in Korea on Aug. 30, 2019, which all contents are incorporated into this patent application by reference. In addition, if this patent application claims priority for countries other than the United States for the same reason as above, all the contents are incorporated into this patent application as references.

The invention claimed is:

1. A steering control device, which filters a noise transmitted from a road surface to a wheel and calculates a reactive torque, comprising:
 a noise frequency calculator configured to calculate a noise frequency of the noise transmitted to the wheel;
 a noise frequency filter, electrically connected to the noise frequency calculator, configured to determine a filtering degree based on a driving mode selected from two or more driving modes, and filter the noise frequency according to the filtering degree, wherein each of the two or more driving modes has a predetermined filtering degree;
 a reactive torque calculator, electrically connected to the noise frequency filter, configured to calculate the reactive torque based on the filtered noise frequency; and
 a tuner, electrically connected to the noise frequency filter, configured to output a tuning signal corresponding to a user's tuning operation,
 wherein the noise frequency filter performs a fine adjustment of the filtering degree, according to the tuning signal, from the predetermined filtering degree of the selected driving mode selected from among the two or more driving modes.

2. The steering control device of claim 1, wherein the noise frequency calculator compares a rotation speed of the wheel with a target rotation speed, and calculates the noise frequency based on the comparison result.

3. The steering control device of claim 1, wherein the two or more driving modes include a normal mode, a comfort mode, and a sports mode which are classified according to driving characteristics,
 wherein the noise frequency filter sets a variable filter corresponding to the filtering degree determined based on the selected driving mode, and filters the noise frequency by using the variable filter.

4. The steering control device of claim 3, wherein the noise frequency filter sets a first variable filter for filtering by a first filtering degree if the driving mode is the normal mode, sets a second variable filter for filtering by a second filtering degree greater than the first filtering degree if the driving mode is the comfort mode, and sets a third variable filter for filtering by a third filtering degree smaller than the first filtering degree if the driving mode is the sports mode.

5. The steering control device of claim 3, wherein the variable filter is a low pass filter comprising a low pass cutoff frequency, and the low pass cutoff frequency is changed to a frequency corresponding to the filtering degree predetermined according to the driving mode.

6. The steering control device of claim 5, wherein, based on a frequency corresponding to a normal filtering degree in the normal mode, the low pass cutoff frequency is changed to be smaller than the frequency corresponding to the normal filtering degree if the driving mode is the comfort mode, and is changed to be greater than the frequency corresponding to the normal filtering degree if the driving mode is the sports mode.

7. The steering control device of claim 3, wherein the variable filter is a high pass filter comprising a high pass cutoff frequency, and the high pass cutoff frequency is changed to a frequency corresponding to the filtering degree predetermined according to the driving mode.

8. The steering control device of claim 7, wherein, based on a frequency corresponding to a normal filtering degree in the normal mode, the high pass cutoff frequency is changed to be greater than the frequency corresponding to the normal filtering degree if the driving mode is the comfort mode, and is changed to be smaller than the frequency corresponding to the normal filtering degree if the driving mode is the sports mode.

9. The steering control device of claim 3, wherein the variable filter is a band pass filter comprising a center frequency and a bandwidth, and at least one of the center frequency and the bandwidth is changed based on the filtering degree predetermined according to the driving mode.

10. The steering control device of claim 9, wherein, based on a frequency corresponding to a normal filtering degree in the normal mode, the center frequency is changed to be smaller or greater than the frequency corresponding to the normal filtering degree if the driving mode is the comfort mode or the sports mode.

11. The steering control device of claim 9, wherein, based on a bandwidth corresponding to a normal filtering degree in the normal mode, the bandwidth is changed to be greater than the bandwidth corresponding to the normal filtering degree if the driving mode is the comfort mode, and is changed to be smaller than the bandwidth corresponding to the normal filtering degree if the driving mode is the sports mode.

12. The steering control device of claim 1, wherein the noise frequency filter is configured to,
 receive a first signal or a second signal from a switch for changing an operation of the noise frequency filter,
 determine differently the filtering degree of the noise frequency based on the driving mode when receiving the first signal, and
 determine the same filtering degree regardless of the driving mode when receiving the second signal.

13. A steering control method for filtering a noise transmitted from a road surface to a wheel and calculating a reactive torque, comprising:
 calculating a noise frequency of the noise transmitted to the wheel;
 determining a filtering degree based on a driving mode selected from two or more driving modes, wherein each of the two or more driving modes has a predetermined filtering degree;
 receiving a user's tuning operation and outputting a tuning signal;
 finely adjusting the filtering degree, according to the tuning signal, from the predetermined filtering degree of the selected driving mode selected from among the two or more driving modes;
 filtering the noise frequency according to the filtering degree; and calculating the reactive torque based on the filtered noise frequency.

14. The steering control method of claim 13, wherein the two or more driving modes include a normal mode, a comfort mode, and a sports mode which are classified according to driving characteristics,
wherein, filtering the noise frequency comprises setting a variable filter corresponding to the filtering degree determined based on the selected driving mode, and filtering the noise frequency by using the variable filter.

15. The steering control method of claim 14, wherein filtering the noise frequency comprises,
setting a first variable filter for filtering by a first filtering degree if the driving mode is the normal mode,
setting a second variable filter for filtering by a second filtering degree greater than the first filtering degree if the driving mode is the comfort mode, and
setting a third variable filter for filtering by a third filtering degree smaller than the first filtering degree if the driving mode is the sports mode.

16. The steering control method of claim 14, wherein the variable filter is a low pass filter comprising a low pass cutoff frequency, and the low pass cutoff frequency is changed to a frequency corresponding to the filtering degree predetermined according to the driving mode.

17. The steering control method of claim 14, wherein the variable filter is a high pass filter comprising a high pass cutoff frequency, and the high pass cutoff frequency is changed to a frequency corresponding to the filtering degree predetermined according to the driving mode.

18. The steering control method of claim 14, wherein the variable filter is a band pass filter comprising a center frequency and a bandwidth, and at least one of the center frequency and the bandwidth is changed based on the filtering degree predetermined according to the driving mode.

19. The steering control device of claim 1, wherein a range of the fine adjustment of the filtering degree available for one of the two or more driving modes does not overlap a range of the fine adjustment of the filtering degree available for others of the two or more driving modes.

* * * * *